No. 829,086. PATENTED AUG. 21, 1906.
J. A. PERKINS.
END THRUST RESISTING MEANS FOR BEARINGS.
APPLICATION FILED NOV. 11, 1903.
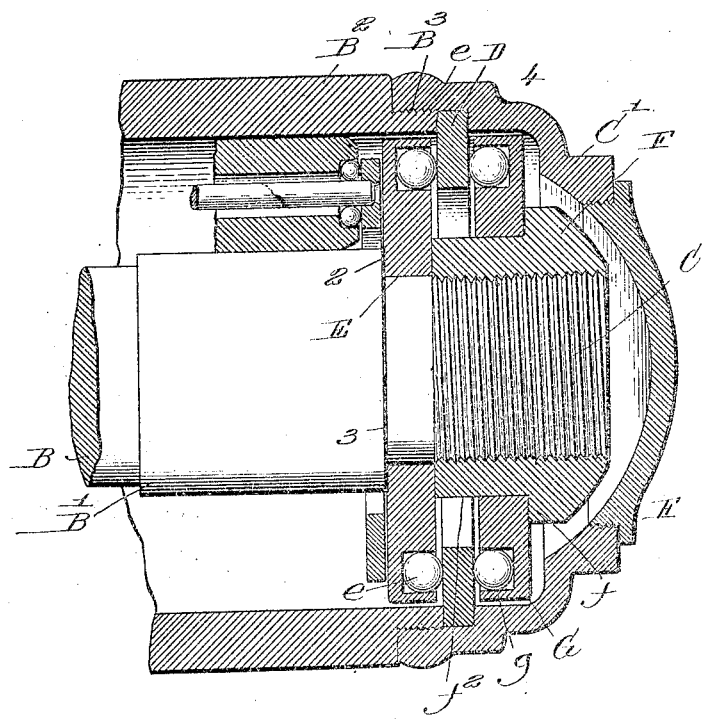

UNITED STATES PATENT OFFICE.

JULIUS A. PERKINS, OF OMAHA, NEBRASKA, ASSIGNOR TO MOFFETT BEARING COMPANY, OF COUNCIL BLUFFS, IOWA.

END-THRUST-RESISTING MEANS FOR BEARINGS.

No. 829,086. Specification of Letters Patent. Patented Aug. 21, 1906.

Application filed November 11, 1903. Serial No. 180,729.

*To all whom it may concern:*

Be it known that I, JULIUS A. PERKINS, a citizen of the United States, residing at Omaha, in the county of Douglas and State of Nebraska, have invented an Improvement in End-Thrust-Resisting Means for Bearings, of which the following description, in connection with the accompanying drawing, is a specification, like characters on the drawing representing like parts.

This invention has for its object a novel construction of means for resisting end thrust in bearings, especially bearings such as shown in United States Patent No. 713,058, granted November 11, 1902, my invention being also, it will be understood, applicable to any form of bearing wherein it is desired to resist successfully the wear and shock due to end thrust in opposite directions.

In the patent referred to a series of balls in a ball-race at one side of an end-thrust ring contact with a ring or track at the end of the hub or box.

In another application filed concurrently with this, Serial No. 180,727, I have shown an end-thrust washer interposed between two tracks detached from the axle, one of which tracks also serves as a cage-controller, said washer having antifriction devices at both sides; but herein I have sustained through the axle two end-thrust washers each having at one face antifriction devices that contact with opposite sides of a track at the end of the hub or box, said track being shown as entering a pocket in an extension of the hub or box and as restrained against movement longitudinally of the axis of the axle.

The drawing shows in section a sufficient portion of a hub or box and axle with my improvements added to enable my invention to be understood.

In the drawing, the axle B, having an enlarged portion B', on which in practice will rest and roll usual bearing-rollers held in cages, as represented in said patent, and the hub or box $B^2$ are and may be all as fully described in said patent. Herein the axle has a tenon C provided with a screw-thread, and between the shoulder 2 of the axle and the inner end of the screw-thread the axle has a reduced portion or neck 3. The end of the hub or box is shown as having a projection $B^3$, represented as threaded externally, on which is screwed the cap or box extension C', having a screw-threaded portion to be engaged with the projection $B^3$. The cap or box extension has a pocket 4, which coacts with the end of the projection $B^3$ to hold between them a track D, shown as a ring. The neck is surrounded by an end-thrust washer E, having antifriction means, shown as a series of balls $e$ in a ball-race cut in the face of the ring next the track D. The tenon has applied to it a nut F, shown as provided with a shoulder $f$, at one side of which is a neck $f^2$, that receives over it a second end-thrust washer G, having antifriction devices, shown as a series of balls $g$, held in a ball-race made in that side of said end-thrust washer next the track D. These balls contact with the track at its opposite sides and serve to resist without shock the end-thrust strains that always exist to a greater or less extent in all bearings. The inner end of nut F is made to contact with one side of the washer E.

I believe that I am the first to use a hub or box having a track restrained against longitudinal movement therein, and to provide for running against the opposite sides of said track, it surrounding the tenon of the axle, I employ antifriction means supported through the axle at the outer end of the hub or box. In my improvement herein illustrated the track D at the end of the box is shown as sustained in a pocket of the cap or box extension, and the innermost end-thrust washer of the pair, it surrounding the tenon of the axle, acts as a cage-controller against which the end of the usual roller-cage acts at intervals in its endwise-traveling movement.

Having described my invention, what I claim, and desire to secure by Letters Patent, is—

1. In a bearing, a hub or box, an axle having a tenon, a track disconnected from said axle, a plurality of end-thrust washers surrounding said tenon at the outer end of the axle and disconnected from the hub or box, and balls interposed between said washers and track.

2. In a bearing, a hub or box, an axle having at its outer end a tenon, a track sustained by said box, and a plurality of end-thrust washers surrounding said tenon and having each a groove, antifriction means in said grooves, said antifriction means contacting with opposite sides of said track.

3. In a roller-bearing, a hub or box, a track sustained by the hub or box near its outer end, an axle having a tenon at its outer end, and two end-thrust washers surounding said tenon and provided at their contiguous sides with annular grooves, and antifriction means in said grooves, said antifriction means contacting normally with opposite sides of said track.

4. An axle having a reduced neck and a threaded tenon, a hub or box, a track sustained in the outer end of said hub or box, a nut on said tenon, and two end-thrust washers, one sustained by the tenon at the outer end of the axle, and the other by the nut surrounding said tenon, each washer having an annular groove, and antifriction means in said grooves and contacting with opposite sides of said track, the latter being interposed between said washers.

5. An axle having a reduced neck and threaded tenon, a hub or box, a track sustained by said hub or box, a shouldered nut on said tenon, and two end-thrust washers, one sustained by the tenon of the axle, and the other by the nut on said tenon, each washer having an annular groove and antifriction-rollers in said grooves contacting with opposite sides of said track, said nut extending through said track and abutting the end-thrust washer sustained by said tenon.

6. In a bearing, a hub or box having a cup provided with a pocket, a track sustained in said pocket, an axle having a tenon at its outer end, and two end-thrust washers surrounding said tenon and having antifriction means contacting with the opposite sides of said track.

In testimony whereof I have signed my name to this specification in the presence of two subscribing witnesses.

JULIUS A. PERKINS.

Witnesses:
GEO. W. GREGORY,
EDITH M. STODDARD.